United States Patent
Jitsui

(10) Patent No.: US 11,762,226 B2
(45) Date of Patent: Sep. 19, 2023

(54) DISPLAY DEVICE AND DISPLAY DEVICE CONTROL METHOD

(71) Applicant: InnoLux Corporation, Miao-Li County (TW)

(72) Inventor: Kazuto Jitsui, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 17/386,388

(22) Filed: Jul. 27, 2021

(65) Prior Publication Data

US 2023/0034845 A1 Feb. 2, 2023

(51) Int. Cl.
*G02F 1/13* (2006.01)
*G02F 1/133* (2006.01)
*G02F 1/1335* (2006.01)
*G02F 1/1347* (2006.01)

(52) U.S. Cl.
CPC ........ *G02F 1/1323* (2013.01); *G02F 1/13306* (2013.01); *G02F 1/133528* (2013.01); *G02F 1/1347* (2013.01)

(58) Field of Classification Search
CPC .................................................. G02F 1/1323
See application file for complete search history.

(56) References Cited

U.S. PATENT DOCUMENTS

| 10,895,777 B1 | 1/2021 | Lin et al. |
| 2016/0097943 A1 | 4/2016 | Mimura et al. |
| 2018/0188576 A1* | 7/2018 | Xu .................. G02F 1/1393 |
| 2020/0257153 A1* | 8/2020 | Robinson .......... G02F 1/133504 |
| 2020/0326567 A1 | 10/2020 | Fang et al. |

FOREIGN PATENT DOCUMENTS

| CN | 107085327 A | 8/2017 |
| TW | 202037939 A | 10/2020 |
| TW | 202113430 A | 4/2021 |

OTHER PUBLICATIONS

TW Office Action dated Dec. 23, 2022 in Taiwan application No. 111121808.

\* cited by examiner

*Primary Examiner* — Edmond C Lau
(74) *Attorney, Agent, or Firm* — McClure, Qualey & Rodack, LLP

(57) ABSTRACT

A display device is provided. The display device includes a display module and a privacy module. The display module includes a light source that emits an input light. The privacy module is disposed on the display module and for receiving the input light. The privacy module includes a first polarizing element for absorbing light in a predetermined direction.

12 Claims, 11 Drawing Sheets

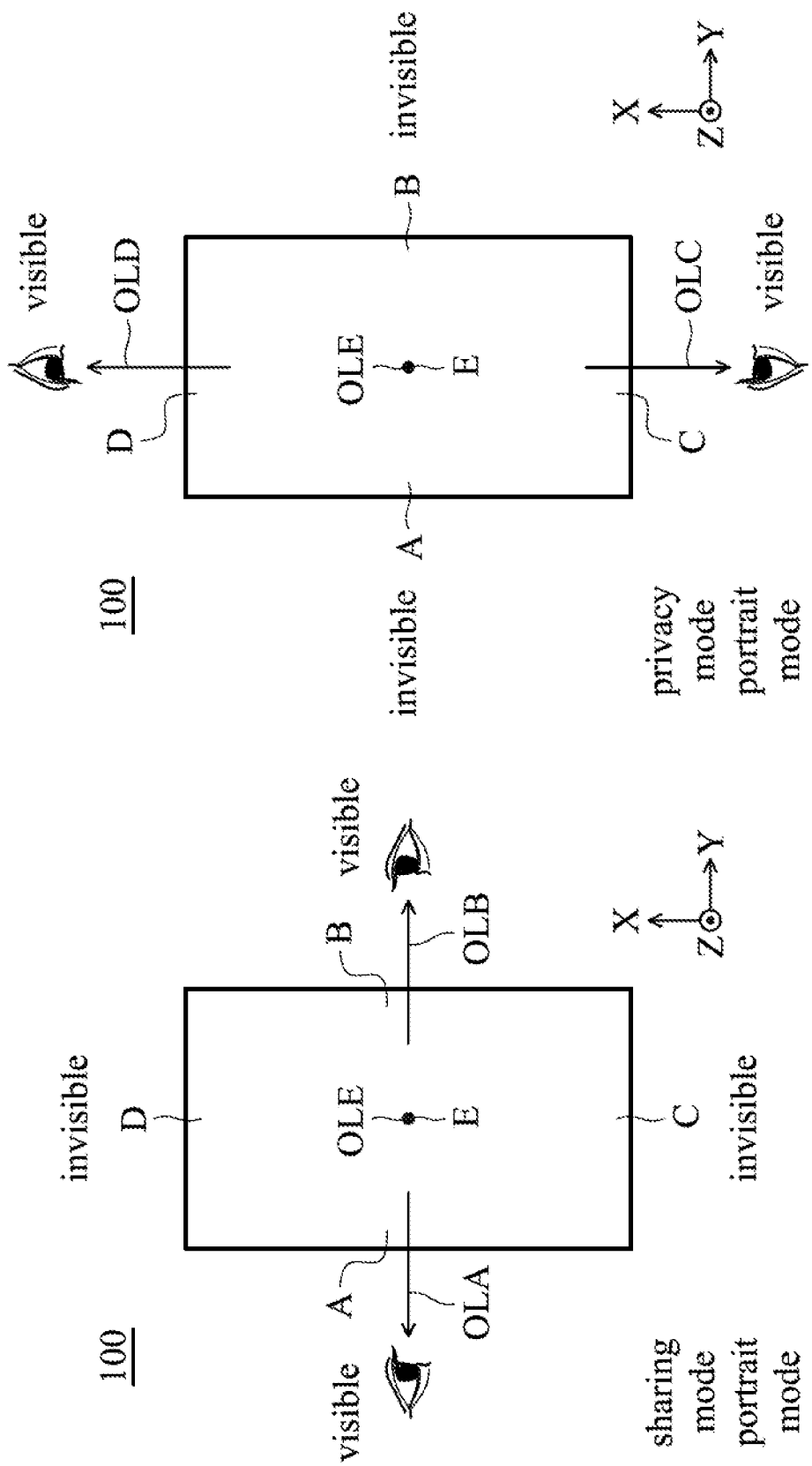

DISPLAY DEVICE AND DISPLAY DEVICE CONTROL METHOD

BACKGROUND OF THE INVENTION

Field of the Invention

The present disclosure relates to a display device, and in particular to a display device that includes a privacy module.

Description of the Related Art

Display devices are commonly used in various electronic devices or mobile devices. Currently, some display devices can have the effect of adjusting the visible angle, reducing the angle at which the screen (displayed by the display device) can be seen by others, thereby helping to protect the privacy of the user.

Recently, privacy displays have been developed for several uses, such as for automotive displays, computer notebook displays, personal computer (PC) monitors, automated teller machine (ATM) displays, etc. Current privacy displays can make the displayed image unreadable from a left-right direction.

However, existing display devices are capable of achieving privacy mode only for a specific orientation of the display device. The display device cannot protect the privacy of the user when the display device is rotated, and it fails to meet the privacy needs of the user. For example, mobile devices (such as tablet PC, 2in1 PC, smartphone, etc., but not limited thereto) are used in landscape mode and portrait mode. In such cases, the current privacy function is not sufficient.

Although a whole direction privacy function device can be used, the narrow backlight distribution backlight design is difficult, and it requires a lot of power. The brightness of the whole direction privacy function device in the sharing mode is too high, and the brightness of the whole direction privacy function device in the privacy mode is too dark. Although a dual backlight system may be used, the design of the transparent backlight is difficult, and is has a low luminance. The brightness of the dual backlight system in the sharing mode is too high, and the brightness of the dual backlight system in the privacy mode is too dark.

Therefore, finding a way to solve the above problem has become an important issue.

BRIEF SUMMARY OF THE INVENTION

An embodiment of the present disclosure provides a display device. The display device includes a display module and a privacy module. The display module includes a light source that emits an input light. The privacy module is disposed on the display module and for receiving the input light. The privacy module includes a first polarizing element for absorbing light in a predetermined direction.

An embodiment of the present disclosure provides a display device control method. The display device control method includes providing a display device including a light modulator; determining an operation mode of the display device; sensing an orientation mode of the display device; and controlling the light modulator based on the operation mode and the orientation mode of the display device.

BRIEF DESCRIPTION OF THE DRAWINGS

The present disclosure can be more fully understood by reading the subsequent detailed description and examples with references made to the accompanying drawings, wherein:

FIG. 6C shows a top view of the display device according to some embodiments of the present disclosure.

FIG. 6D shows a top view of the display device according to some embodiments of the present disclosure.

DETAILED DESCRIPTION OF THE INVENTION

Figure 1:
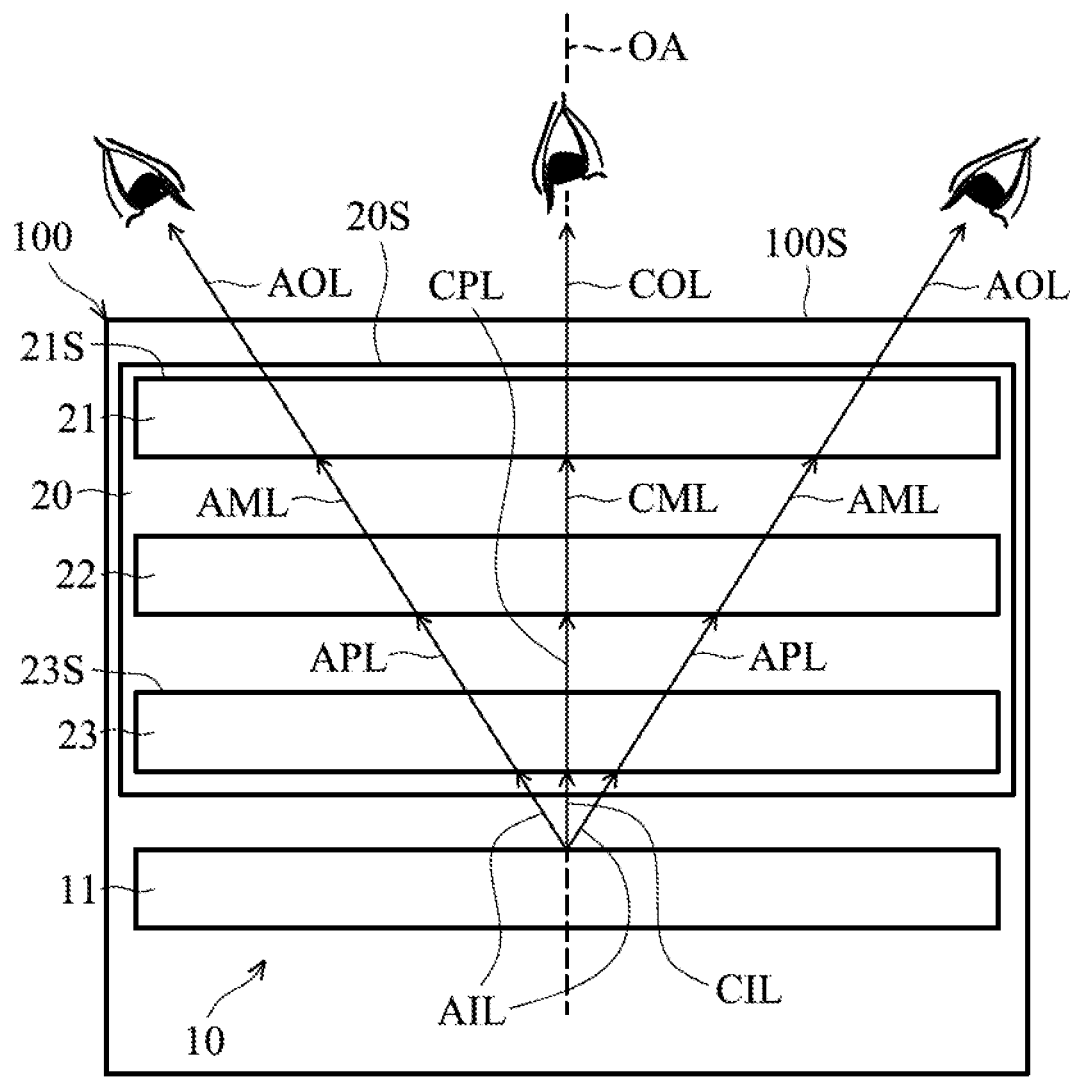
FIG. 1 shows a schematic view of a display device according to some embodiments of the present disclosure.

The present disclosure may be more clearly understood by referring to the following description and the appended drawings. It should be noted that, for the sake of the simplicity of the drawings and comprehensibility for readers, only a portion of the light-emitting unit is illustrated in multiple figures in the present disclosure, and the specific components in the figures are not drawn to scale. In addition, the number and size of each component in the drawings merely serve as an example, and are not intended to limit the scope of the present disclosure. Furthermore, similar and/or corresponding numerals may be used in different embodiments for describing some embodiments simply and clearly, but they do not represent any relationship between different embodiments and/or structures discussed below.

Certain terms may be used throughout the present disclosure and the appended claims to refer to particular elements. Those skilled in the art will understand that electronic device manufacturers may refer to the same components by different names. The present specification is not intended to distinguish between components that have the same function but different names. In the following specification and claims, the words "including", "comprising", "having" and the like are open-ended words, so they should be interpreted as meaning "including but not limited to . . . " Therefore, when the terms "including", "comprising", and/or "having" are used in the description of the disclosure, the presence of corresponding features, regions, steps, operations and/or components is specified without excluding the presence of one or more other features, regions, steps, operations and/or components.

In addition, in this specification, relative expressions may be used. For example, "lower", "bottom", "higher" or "top" are used to describe the position of one element relative to another. It should be noted that if a device is flipped upside down, an element that is "lower" will become an element that is "higher".

When a corresponding component (i.e. a film layer or region) is referred to as "on another component", it may be directly on another component, or there may be other components in between. On the other hand, when a component is referred "directly on another component", there is no component between the former two. In addition, when a component is referred "on another component", the two components have an up-down relationship in the top view, and this component can be above or below the other component, and this up-down relationship depends on the orientation of the device.

The terms "about," "equal to," "equivalent," "the same as," "essentially," or "substantially" are generally interpreted as within 20% of a given value or range, or as interpreted as within 10%, 5%, 3%, 2%, 1%, or 0.5% of a given value or range.

It should be understood that, although the terms "first", "second" etc. may be used herein to describe various elements, layers and/or portions, and these elements, layers, and/or portions should not be limited by these terms. These terms are only used to distinguish one element, layer, or portion. Thus, a first element, layer or portion discussed below could be termed a second element, layer or portion without departing from the teachings of some embodiments of the present disclosure. In addition, for the sake of brevity, terms such as "first" and "second" may not be used in the description to distinguish different elements. As long as it does not depart from the scope defined by the appended claims, the first element and/or the second element described in the appended claims can be interpreted as any element that meets the description in the specification.

In the present disclosure, the thickness, length, and width can be measured by using an optical microscope, and the thickness can be measured by the cross-sectional image in the electron microscope, but it is not limited thereto. In addition, a certain error may be present in a comparison with any two values or directions. If the first value is equal to the second value, the deviation between the first value and the second value may be within about 10%. If the first direction is perpendicular to the second direction, the angle between the first direction and the second direction may be between 80 degrees and 100 degrees. If the first direction is parallel to the second direction, the angle between the first direction and the second direction may be between 0 degrees and 10 degrees.

It should be noted that the technical solutions provided by different embodiments below may be interchangeable, combined or mixed to form another embodiment without departing from the spirit of the present disclosure.

Unless defined otherwise, all terms (including technical and scientific terms) used herein have the same meaning as commonly understood by one having ordinary skill in the art to which this disclosure belongs. It should be appreciated that, in each case, the term, which is defined in a commonly used dictionary, should be interpreted as having a meaning that conforms to the relative skills of the present disclosure and the background or the context of the present disclosure, and should not be interpreted in an idealized or overly formal manner unless so defined in the present disclosure.

Please refer to FIG. 1, which shows a schematic view of a display device 100 according to some embodiments of the present disclosure. In some embodiments, the display device 100 may be a monitor, touch display, a curved display, a free shape display, etc., but not limited thereto. In some embodiments, the display device 100 may be mounted in an electronic device, such as a smartphone or a tablet, etc., but not limited thereto.

Please refer to FIG. 1. The display device 100 may include a display module 10 and a privacy module 20. The privacy module 20 may be disposed on the display module 10. The display module 10 may include a light source 11, which emits input light IL to the privacy module 20, and the privacy module 20 receives input light IL. The privacy module 20 can include a first polarizing element 21 for absorbing light in a predetermined direction. In some embodiments, the predetermined direction can be any direction that is not parallel to an optical axis OA of the display device 100. As shown in FIG. 1, in some embodiments, the optical axis OA can be perpendicular to an output surface 100S (from where the light leaves the display device 100) of the display device 100. As shown in FIG. 1, in some embodiments, the optical axis OA can be perpendicular to an output surface 20S (from where the light leaves the privacy module 20) of the privacy module 20. In some embodiment, the first polarizing element 21 is the top element of the privacy module 20, and the optical axis OA can be perpendicular to an output surface 21S of the first polarizing element 21. In FIG. 1, the optical axis OA may be parallel to the Z axis.

In some embodiments, the privacy module 20 is for receiving the input light IL to generate an output light OL on the output surface 100S of the display device 100. For example, as shown in FIG. 1, the output surface 100S is a surface parallel to X-Y plane. For example, as shown in FIG. 1, the optical axis OA is parallel to Z axis. The input light IL includes a vertical input light CIL parallel to the optical axis OA, and an inclined input light AIL not parallel to the optical axis OA. In some embodiments, the privacy module 20 includes a first polarizing element 21. Referring to FIG. 3B, the vertical input light CIL is not polarized by the first polarizing element 21, and the inclined input light AIL is polarized by the first polarizing element 21. Detailed description on the first polarizing element 21 will be described later in the following paragraphs.

In some embodiments, the output surface 100S of the display device 100 may be the outermost surface of the display device 100. For example, in FIG. 1, the first polarizing element 21 is the top element of the privacy module 20. For example, in FIG. 1, although not shown as one surface, the output surface 100S may be the output surface 20S of the privacy module 20. For example, in FIG. 1, although not shown as one surface, the output surface 20S may be the output surface 21S of the first polarizing element 21. For example, in FIG. 1, although not shown as one surface, the output surface 100S, the output surface 20S and the output surface 21S may be regarded as the same surface.

As shown in FIG. 1, in some embodiments, the privacy module 20 may include the first polarizing element 21, a light modulator 22 and a second polarizing element 23. The light modulator 22 may be disposed between the first polarizing element 21 and the second polarizing element 23, wherein the second polarizing element 23 has an output surface 23S. However, please note that the configuration of privacy module 20 shown in FIG. 1 is only an exemplary embodiment of the present disclosure, more examples of configurations of the privacy module 20 are described and shown below. In FIG. 1, the second polarizing element 23 is disposed between the light modulator 22 and the display module 10.

Still referring to FIG. 1, according to some embodiments (although not shown), the positions of the first polarizing element 21 and the second polarizing element 23 can be exchanged, that is, the first polarizing element 21 can be disposed between the light modulator 22 and the display module 10. In some embodiments, the second polarizing element 23 is the top element of the privacy module 20. For example, the output surface 100S of the display device 100 may be the output surface 20S of the privacy module 20. For example, the output surface 20S may be the output surface 23S of the second polarizing element 23. For example, the output surface 100S, the output surface 20S and the output surface 23S may be regarded as the same surface. In the embodiment where the second polarizing element 23 is the top element of the privacy module 20, and the optical axis OA can be perpendicular to the output surface 23S of the second polarizing element 23.

Please refer to FIG. 1, the vertical input light CIL is incident from the light source 11 to the privacy module 20, and the vertical input light CIL is on and parallel to the optical axis OA. The vertical input light CIL passes the second polarizing element 23, and the vertical input light CIL is polarized to be a vertical polarized light CPL. The vertical polarized light CPL is converted to a vertical modulated light CML after passing through the light modulator 22. The vertical modulated light CML is converted to the vertical output light COL after passing first polarizing element 21.

The inclined input lights AIL are incident from the light source 11 to the privacy module 20, and the inclined input lights AIL are not parallel to the optical axis OA. The inclined input lights AIL pass the second polarizing element 23, and the inclined input lights AIL are polarized to be inclined polarized lights APL. The inclined polarized lights APL are converted to inclined modulated lights AML after passing through the light modulator 22. The inclined modulated lights AML passing through the light modulator 22 is called inclined output light AOL.

Figure 2A:
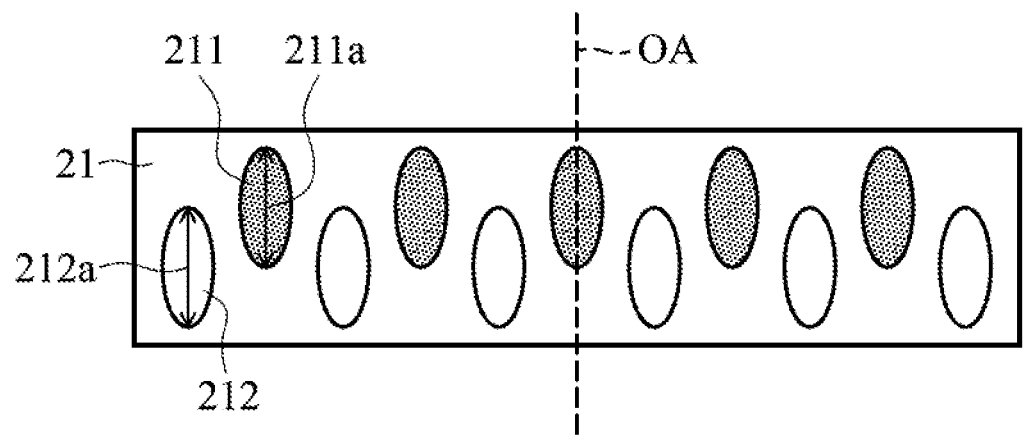
FIG. 2A shows a cross-sectional view of a first polarizing element according to some embodiments of the present disclosure.
Figure 2B:
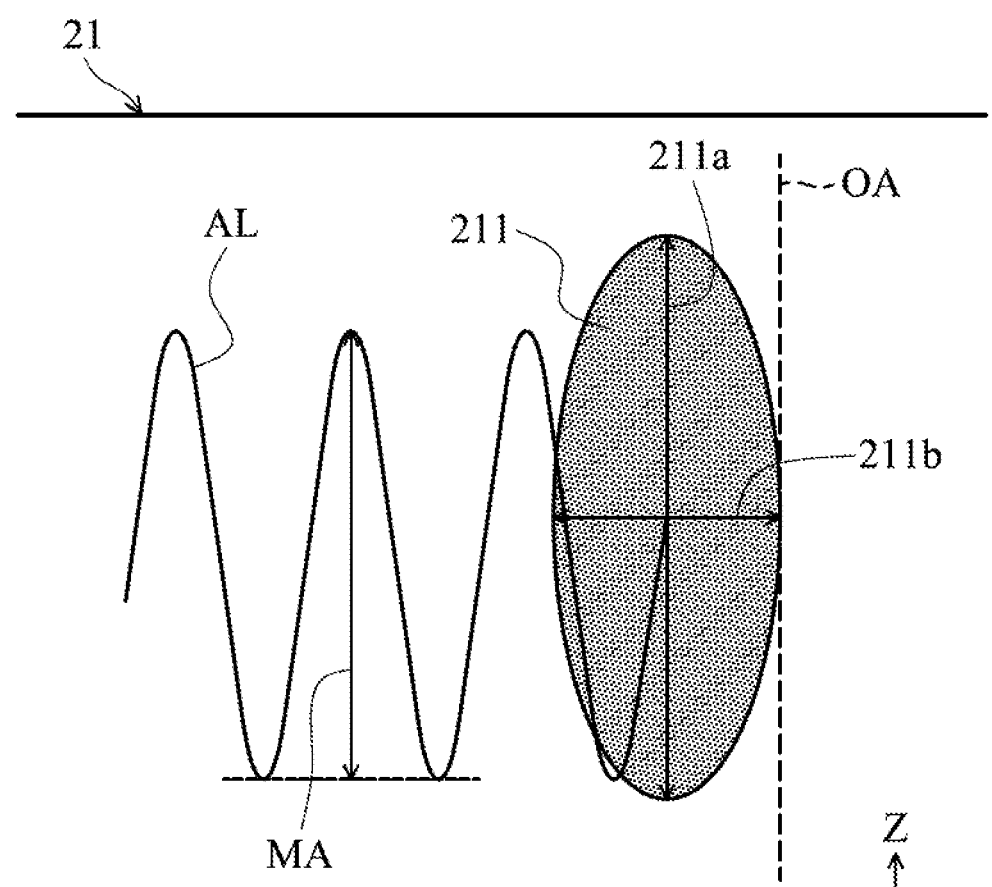
FIG. 2B shows a schematic view of a light absorbing dye of the first polarizing element.

Please refer to FIG. 2A and FIG. 2B. FIG. 2A shows a cross-sectional view of the first polarizing element 21 according to some embodiments of the present disclosure. The first polarizing element 21 can include a light absorbing dye 211 and a liquid crystal 212. The light absorbing dye 211 may include a dichroic dye. FIG. 2B shows a schematic view of the light absorbing dye 211. The first polarizing element 21 may absorb the light based on its traveling direction ID. The traveling direction ID is the direction in which the light travels, which is shown in FIG. 3C. In some embodiments, the first polarizing element 21 may be (or may be called) a light control film or an advanced light control film.

As shown in FIG. 2A and FIG. 2B, in some embodiments, the cross-section of the light absorbing dye 211 may be in an ellipsoid shape. That is, the light absorbing dye 211 may have an ellipsoid shape. The light absorbing dye 211 may have a longitudinal axis (or a major axis) 211a. The major axis 211a is the longer axis of the light absorbing dye 211, and the major axis 211a passes through the foci (not shown) of the ellipsoid shape (the light absorbing dye 211). According to some embodiments, in the display device 100, the first polarizing element 21 can be disposed such that the longitudinal axis 211a of the light absorbing dye 211 is parallel to the optical axis OA. For example, as shown in FIG. 2A, the longitudinal axis 211a of the light absorbing dye 211 is parallel to Z axis.

In some embodiments, the cross-section of the liquid crystal 212 may be in an ellipse shape. That is, the liquid crystal 212 may have an ellipsoid shape. The liquid crystal 212 may have a major axis 212a. The major axis 212a is the longer axis of the liquid crystal 212, and the major axis 212a passes through the foci (not shown) of the ellipsoid shape (the liquid crystal 212).

Please refer to FIG. 2B, showing the light AL with a light modulation axis MA which is parallel to the Z axis. The modulation axis MA is parallel to the longitudinal axis 211a of the light absorbing dye 211. In some embodiments, accordingly, the light absorbing dye 211 may absorb the light AL with the modulation axis MA being parallel to the longitudinal axis 211a of the light absorbing dye 211. However, the light whose modulation axis is not parallel to the longitudinal axis 211a of the light absorbing dye 211 will not be absorbed. In other words, the light with its modulation axis not parallel to the major axis 211a of the light absorbing dye 211 may pass through the first polarizing element 21.

Please refer to FIG. 2A. The orientation (i.e., the direction of the major axis 211a of the light absorbing dye 211) of the light absorbing dye 211 is controlled by the liquid crystal 212. In some embodiments, the light absorbing dye 211 is aligned by the liquid crystal 212 so that the major axis 211a is substantially parallel to the optical axis OA. In some embodiments, both the major axis 211a of the light absorbing dye 211 and the major axis 212a of the liquid crystal 212 are substantially parallel to the optical axis OA.

Figure 3A:
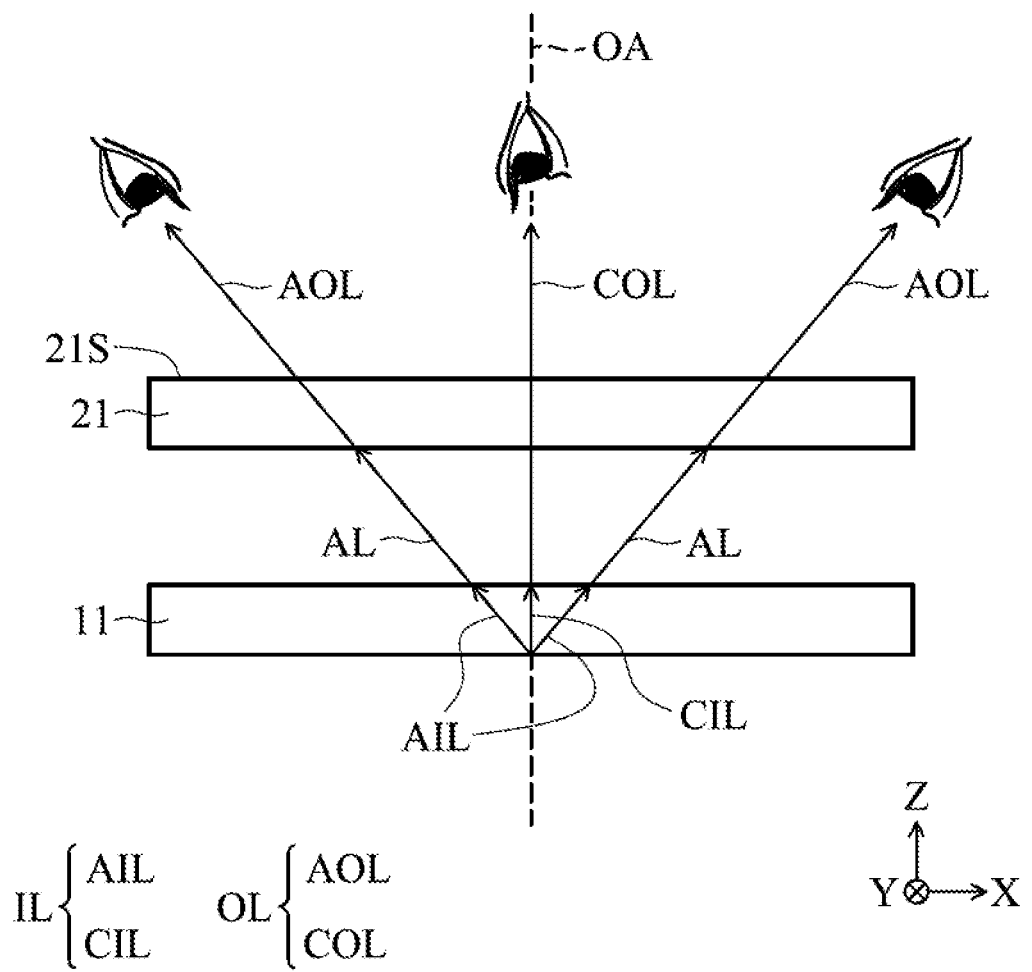
FIG. 3A shows a schematic view of the explanatory progress of an input lights, an absorbed lights, and an output light according to some embodiments of the present disclosure.
Figure 3B:
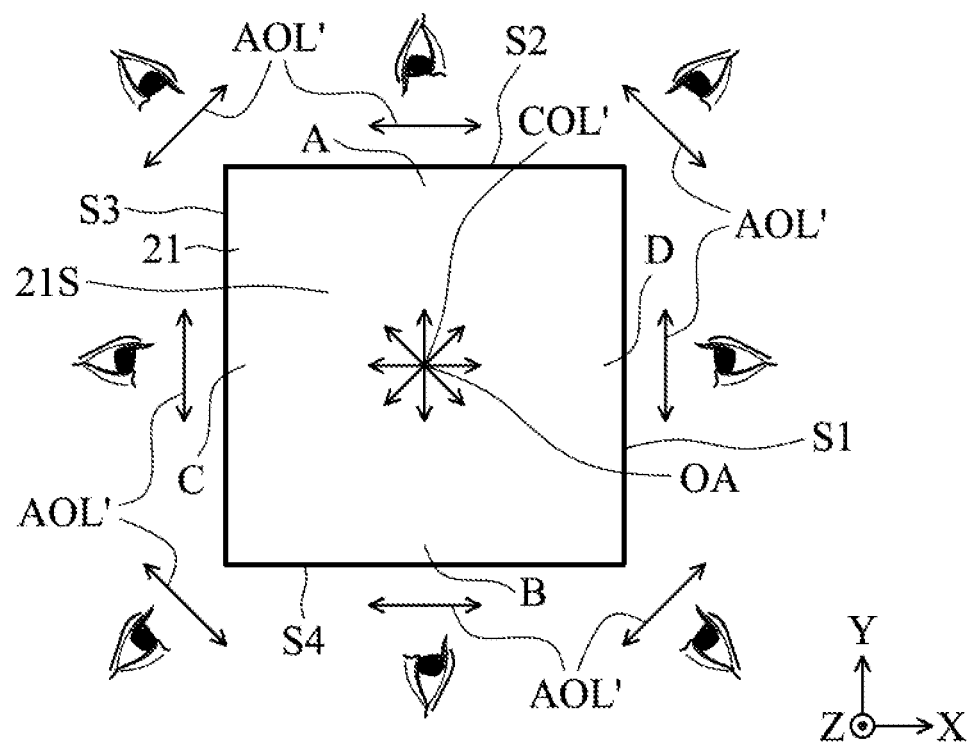
FIG. 3B is a schematic view of the explanatory center polarized directions of a center output light and inclined polarized directions of an inclined output lights according to some embodiments of the present disclosure.
Figure 3C:
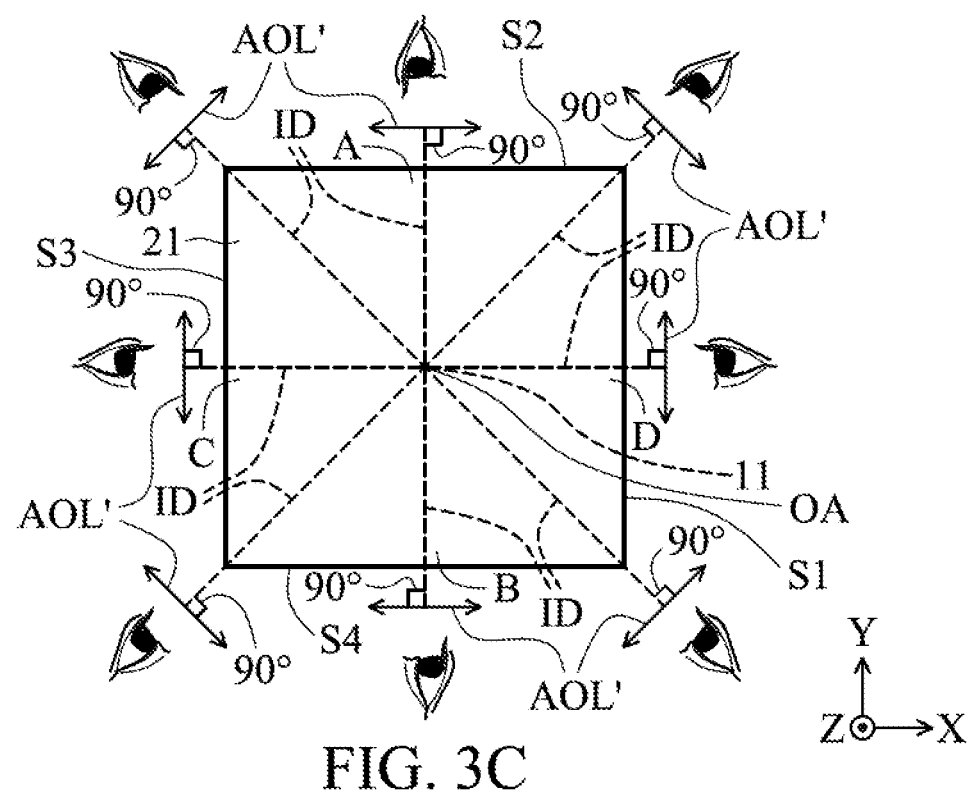
FIG. 3C is a schematic view of the explanatory inclined polarized directions of the inclined output lights according to some embodiments of the present disclosure.

Please refer to FIG. 3A, which shows a schematic view of the explanatory progress of the input lights passing through the first polarizing element 21 according to some embodiments of the present disclosure. In some embodiment, the light incident from the light source 11 may be called the input lights IL. The light that passes through the first polarizing element 21 may be called the output light OL.

As shown in FIG. 3A, the input lights IL may include a vertical input light CIL and a plurality of inclined input lights AIL, and the output lights OL may include a vertical output light COL and a plurality of inclined output lights AOL. The vertical input light CIL and the vertical output light COL are parallel to the optical axis of the display device 100 (or perpendicular to the output surface 21S of the first polarizing element 21), and the inclined output lights AOL and the inclined output lights AOL are not parallel to the optical axis of the display device 100.

As described in FIG. 2B, by means of the first polarizing element 21, light with a predetermined modulation axis MA will be absorbed. As shown in FIG. 3B, and FIG. 3C, the polarized directions of the output lights is different based on the observation position of the output light. For example, the inclined polarized directions AOL' of the inclined output lights AOL depends on the observation position of the inclined output lights AOL. In detail, a part of inclined input light AIL will be absorbed by the first polarizing element 21, a part of the inclined input light AIL will pass through the first polarizing element 21, and the part passing through is called the inclined output lights AOL. Referring to FIG. 3B, the output surface 21S of first polarizing element 21 (X-Y plane) can include four sides S1, S2, S3, and S4. Sides S1 and S3 are parallel to Y axis, and sides S2 and S4 are parallel to X axis. In addition, taking the light observed in the side position, the function of the first polarizing element 21 to the inclined input light AIL will be described in more details. In some embodiments, by means of the light absorbing dye 211 with a longitudinal axis 211a, the light with a predetermined modulation axis MA that is parallel to the longitudinal axis 211a (for example, parallel to Z axis) will be absorbed. In this way, referring to FIGS. 3A, and 3B, in an observation position from the side S1, light with a predetermined modulation axis MA that is parallel to longitudinal axis 211a (for example, parallel to Z axis) will be absorbed, and thus, the polarized direction (shown with a double arrow) of the output light AOL' from the side S1 is parallel to Y axis.

Similarly, in an observation position from the side S2, light with a predetermined modulation axis MA that is parallel to longitudinal axis 211a (for example, parallel to Z axis) will be absorbed, and thus, the polarized direction (shown with a double arrow) of the output light AOL' from the side S2 is parallel to X axis. In addition, in an observation position from the side S3, light with a predetermined modulation axis MA that is parallel to longitudinal axis 211a (for example, parallel to Z axis) will be absorbed, and thus, the polarized direction (shown with a double arrow) of the output light AOL' from the side S3 is parallel to Y axis. Moreover, in an observation position from the side S4, light with a predetermined modulation axis MA that is parallel to longitudinal axis 211a (for example, parallel to Z axis) will be absorbed, and thus, the polarized direction (shown with a double arrow) of the output light AOL' from the side S4 is parallel to X axis.

Accordingly, in observation positions from other sides of the output surface 21S of the first polarizing element 21, light with a predetermined modulation axis MA that is parallel to longitudinal axis 211a will also be absorbed, and related description is omitted for simplicity. In this way, the inclined input light AIL that is not parallel to the optical axis OA is polarized by the first polarizing element 21.

Further referring to FIG. 3A and FIG. 3B, on the other hand, in an observation position from the output surface 21S of the first polarizing element 21, the light will not be absorbed by the first polarizing element 21. In other words, the vertical input light CIL that is parallel to the optical axis OA will not be polarized. Thus, the vertical input light CIL is not polarized by the first polarizing element 21. In other words, the light with its traveling direction ID parallel to the optical axis is not absorbed or not polarized. That is, the vertical input light CIL that is parallel to the optical axis passes through the first polarizing element 21 and is called the vertical output light COL. The polarized directions COL' of the vertical output light COL may be in any direction. Please note that the four double arrows on the output surface 21S indicates that the vertical polarized directions COL' of the vertical output light COL may be in any direction, and the polarized directions of the vertical output light COL are not limited to the four directions indicated by the four double arrows. In this way, the vertical input light CIL that is parallel to the optical axis OA is not polarized by the first polarizing element 21.

Please refer to FIG. 3C. The inclined output lights AOL are polarized. The inclined polarized directions AOL' of the inclined output lights AOL depends on the traveling direction (or observation point) of the inclined output lights AOL. As shown in FIG. 3C, the inclined polarized directions AOL' of the inclined output lights AOL are perpendicular to the optical axis OA. Moreover, each of the inclined polarized directions AOL' of the inclined output lights AOL is perpendicular to the corresponding traveling direction ID of the inclined output light AOL. That is, the inclined polarized directions AOL' of the inclined output lights AOL are perpendicular to the optical axis OA and the corresponding traveling direction ID of each inclined output light AOL.

In position A, the polarized direction AOL' of inclined output light AOL is perpendicular to its traveling direction ID and the optical axis OA, and the polarized direction AOL' is parallel to the X axis. In position B, the polarized direction AOL' of inclined output light AOL is perpendicular to its traveling direction ID and the optical axis OA, and the polarized direction AOL' is parallel to the X axis. In position C, the polarized direction AOL' of inclined output light AOL is perpendicular to its traveling direction ID and the optical axis OA, and the polarized direction AOL' is parallel to the Y axis. In position D, the polarized direction AOL' of inclined output light AOL is perpendicular to its traveling direction ID and the optical axis OA, and the polarized direction AOL' is parallel to the Y axis.

Figure 4:
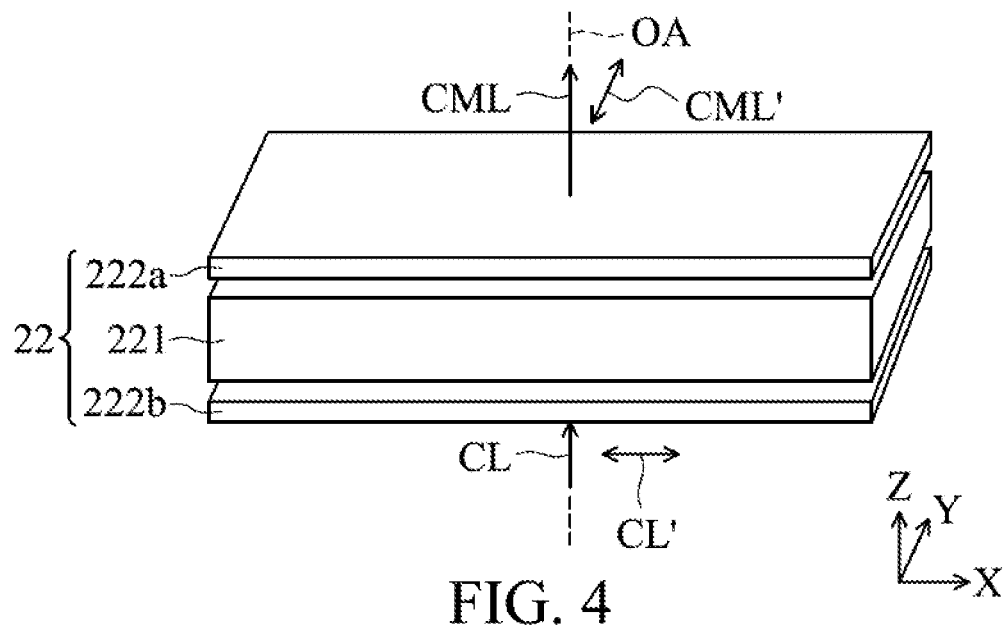
FIG. 4 shows a schematic view of the explanatory progress of the center light incident to a light modulator according to some embodiments of the present disclosure.

Please refer to FIG. 4, which shows a schematic view of the explanatory progress of the input light CL incident to the light modulator 22 according to some embodiments of the present disclosure. The polarization direction of the input light CL can be changed (after passing through the light modulator 22) by a voltage applied to the light modulator 22. According to some embodiments, the light modulator 22 may include a light twist element 221, a first electrode 222a and a second electrode 222b. The light twist element 221 is disposed between the first electrode 222a and the second electrode 222b. In some embodiments, the light twist element 221 can be liquid crystal, but not limited thereto. By applying a voltage between the first electrode 222a and the second electrode 222b, the polarization direction of the input light CL can be changed. In some embodiments, by changing a voltage between the first electrode 222a and the second electrode 222b, the polarization direction of the input light CL can be changed. In some embodiments, the polarization direction of the input light CL will not be changed when a voltage is not applied to the light modulator 22, for example, not applied between the first electrode 222a and the second electrode 222b.

The light modulator 22 may twist the polarized direction of the incident light. In some embodiments, for example, the polarized direction of the incident light may be twisted by 0 degrees, 15 degrees, 45 degrees, 60 degrees, 75 degrees, 90 degrees, 105 degrees, 120 degrees, 135 degrees, 150 degrees, 165 degrees, 180 degrees, etc., but not limited thereto. In some embodiments, the polarized direction of the incident light may be twisted by the light modulator 22 by 90 degrees.

In some embodiments, the light modulator 22 may twist the polarized direction of the incident light when the first electrode 222a and the second electrode 222b apply voltage to the light twist element 221, and the light modulator 22 may not twist the polarized direction of the incident light when the first electrode 222a and the second electrode 222b apply a different voltage to the light twist element 221.

In some embodiments, the light modulator 22 may twist the polarized direction of the incident light by an angle when the first electrode 222a and the second electrode 222b apply voltage to the light twist element 221, and the light modulator 22 may twist the polarized direction of the incident light by a different angle when the first electrode 222a and the second electrode 222b apply a different voltage to the light twist element 221. In some embodiments, the light twist element 221 can be a TN-mode liquid crystal or an EBC-mode liquid crystal. In one embodiment, the polarized direction of the incident light may be twisted by 90 degrees in the TN-mode liquid crystal or the EBC-mode liquid crystal. In one embodiment, the polarized direction of the incident light may be twisted by 45 degrees in the EBC-mode liquid crystal.

In the embodiments shown in FIG. 4, the center light CL may be polarized, and the polarized direction CL' of the center light CL may be parallel to the X-axis. The center light CL is incident to the light modulator 22, and the center light CL can be converted to a center modulated light CIVIL. A voltage can be applied to the light modulator 22, for example, applied to the first electrode 222a and the second electrode 222b, so that the polarized direction CML' of the center modulated light CIVIL is twisted by 90 degrees. That is, the polarized direction CML' of the center modulated light CIVIL may be parallel to the Y-axis.

In some embodiments, the second polarizing element 23 can have an absorption axis perpendicular to the optical axis OA of the display device 100. That is, the absorption axis of the second polarizing element 23 may be on the output surface 100S, the output surface 20S, the output surface 21S, or the output surface 23S. In FIG. 1, the absorption axis of the second polarizing element 23 may be perpendicular to the Z axis or may be on the X-Y plane (that is, the absorption axis of the second polarizing element 23 may be parallel to X axis or Y axis).

In some embodiments, referring to FIG. 1, the absorption axis of the second polarizing element 23 may parallel to the Y-axis. The center polarized light CPL and the inclined polarized lights APL may not be twisted (the light modulator 22 is disabled) when the first electrode 222a and the second electrode 222b apply voltage to the light twist element 221. The second polarizing element 23 may twist the center polarized light CPL and the inclined polarized lights APL by 90 degrees (the light modulator 22 is enabled) when voltage is not applied to the light twist element 221 from the first electrode 222a and the second electrode 222b. In other words, in the above description, the light modulator 22 can be disabled when the voltage is applied, and can be enabled when no voltage is applied. The light twist element 221 is enabled, such that the light passing the light twist element 221 will be twisted. The light twist element 221 is disabled, such that the light passing the light twist element 221 will not be twisted. Unless otherwise specified, the features of the light twist element 221 and the second polarizing element 23 apply to the following embodiments. In some embodiments, the light modulator 22 can be enabled when the voltage is applied, and can be disabled when no voltage is applied.

Figure 5:
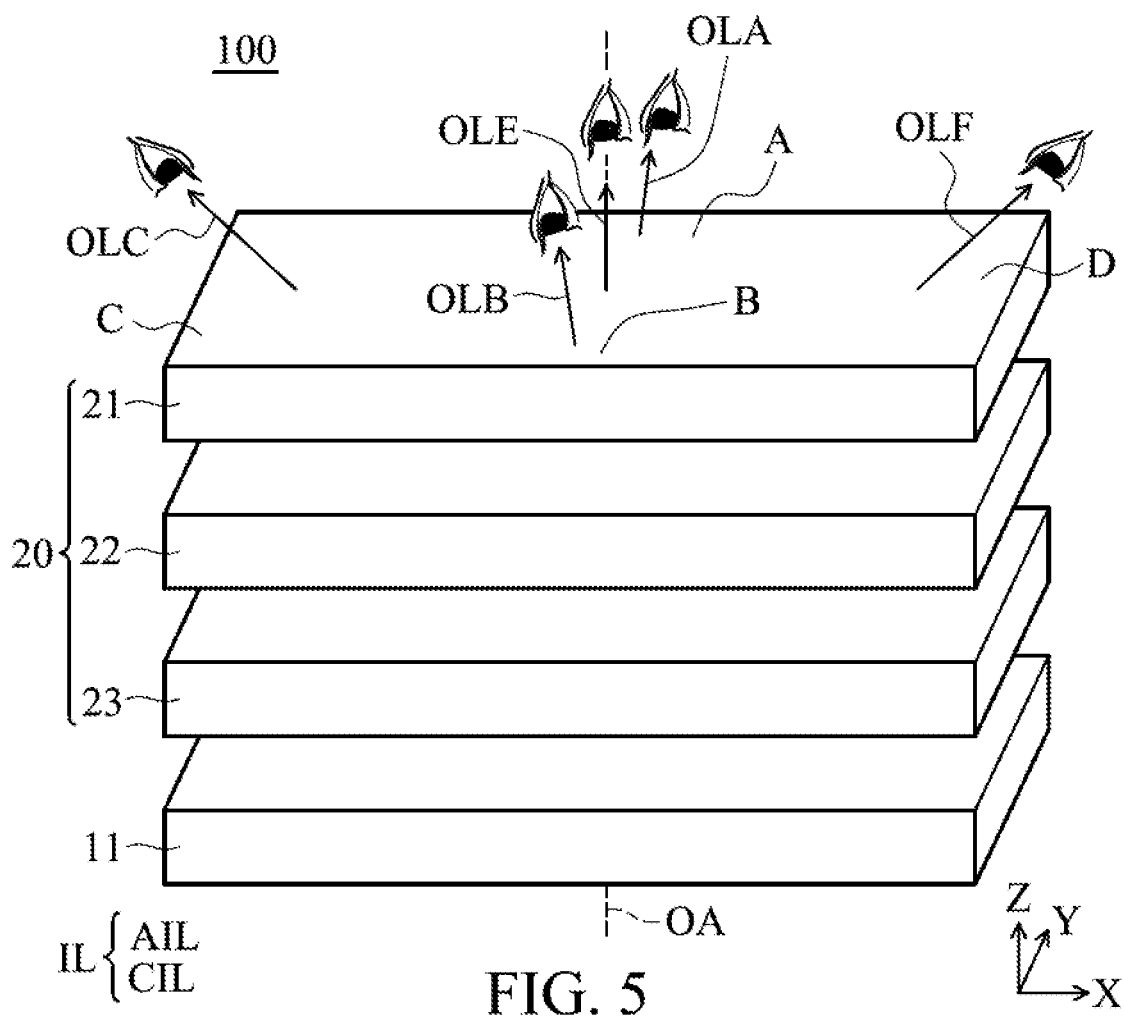
FIG. 5 shows an exemplary embodiment of the display device according to some embodiments of the present disclosure.
Figure 6A:
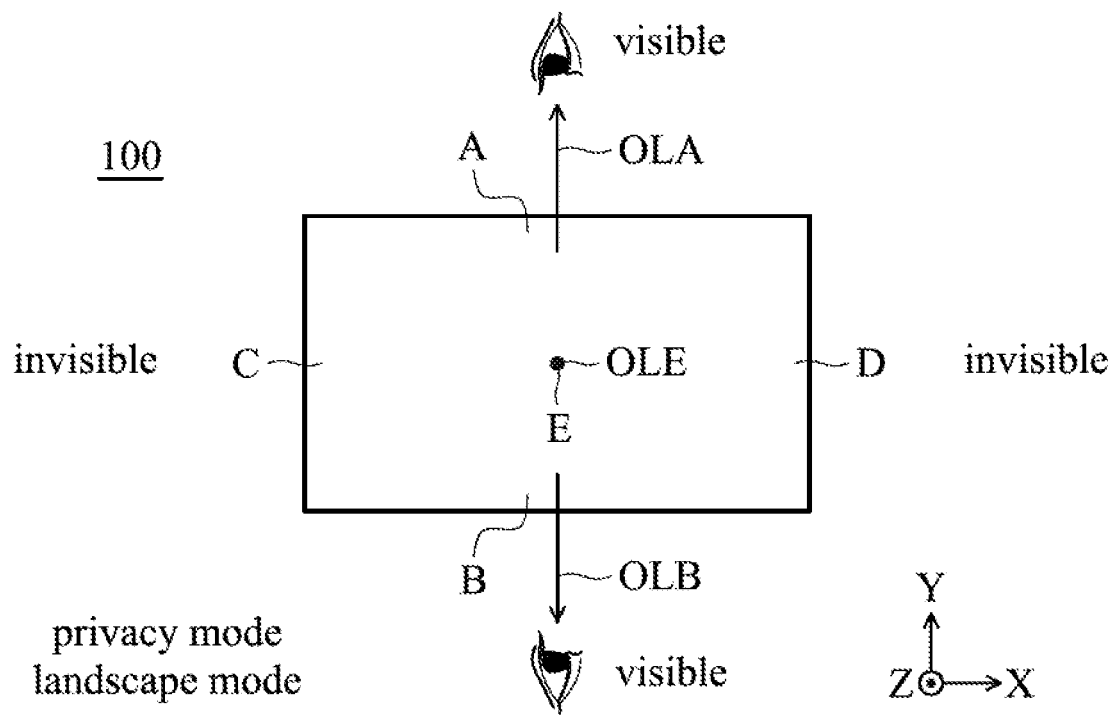
FIG. 6A shows a top view of the display device according to some embodiments of the present disclosure.

Please refer to FIG. 5 and FIG. 6A, which shows an exemplary embodiment of the display device 100 according to some embodiments of the present disclosure. The output lights OLA, OLB, OLC and OLF are output from the positions A, B, C, D of the display device 100, respectively. The output light OLE is on and parallel to the optical axis OA of the display device 100, and the output lights OLA, OLB, OLC and OLF are not parallel to the optical axis OA.

The polarized directions of the output lights when the light modulator 22 is disabled are shown in Table 1.1 and Table 1.2 below. As shown in FIG. 6A, the display device 100 is arranged in a landscape mode. In the X-Y plane, the position C can refer to a left side, and the position D can refer to a right side, the position A can refer to a top side, and the position B can refer to a bottom side. In some embodiments, as shown in FIG. 1, the privacy module 20 can include the first polarizing element 21, a second polarizing element 23, and a light modulator 22 disposed between the first polarizing element 21 and the second polarizing element 23. The second polarizing element 23 can be disposed between the light modulator 22 and the display module 10. In some embodiments, the second polarizing element 23 can have an absorption axis parallel to Y axis.

Table 1.1 and Table 1.2 explains the light passed by the second polarizing element 23, the light modulator 22, and the first polarizing element 21, and the polarized direction of the light is shown. According to Table 1.1 and Table 1.2, as shown in FIG. 6A, at the observation position on the positions C and D, no output light can be observed. That is, content shown in the display device 100 is invisible to the observer on the sides C and D. However, at the observation position on the sides A and B, the output lights can be observed. That is, the content shown in the display device 100 is visible to the observer on the sides A and B. Thus, when the display device 100 is arranged in a landscape mode (for example, by the user), the display device 100 can be in a privacy mode. On the other hand, as shown in FIG. 6C, when the display device 100 is arranged in a portrait mode, the display device 100 can be in a sharing mode.

TABLE 1.1

| Light | Position A | Position B |
|---|---|---|
| Input light | Not polarized | Not polarized |
| Polarized light from the second polarizing element 23 (absorbing the light that is parallel to the Y axis, and the light that is parallel to the X axis is passed) | X-axis | X-axis |
| Modulated light from the light modulator 22 (disabled) | X-axis | X-axis |
| Output light from the first polarizing element 21 | X-axis (Visible) | X-axis (Visible) |

TABLE 1.2

| Light | Position C | Position D | Position E |
|---|---|---|---|
| Input light | Not polarized | Not polarized | Not polarized |
| Polarized light from the second polarizing element 23 (absorbing the light that is parallel to the Y axis, and the light that is parallel to the X axis is passed) | X-axis | X-axis | X-axis |
| Modulated light from the light modulator 22 (disabled) | X-axis | X-axis | X-axis |
| Output light from the first polarizing element 21 | Absorbed (invisible) | Absorbed (invisible) | X-axis (Visible) |

As shown in Table 1.1 and 1.2, the second polarizing element 23 used can have an absorption axis parallel to Y axis (absorb light at Y axis), and when the light modulator 22 is disabled, the inclined output light at Y axis will be absorbed. Thus, the inclined output light will be dark at Y axis, and has the polarized direction in the X axis. The content of the display device 100 can be invisible at the positions C and D and can be visible at positions A and B. Thus, the display device 100 can be in the privacy mode and the landscape mode as shown in FIG. 6A.

TABLE 2.1

| Light | Position A | Position B |
|---|---|---|
| Input light | Not polarized | Not polarized |
| Polarized light from the second polarizing element 23 (absorbing the light that is parallel to the Y axis, and the light that is parallel to the X axis is passed) | X-axis | X-axis |
| Modulated light from the light modulator 22 (enabled) | Y-axis | Y-axis |
| Output light from the first polarizing element 21 | Absorbed (invisible) | Absorbed (invisible) |

TABLE 2.2

| Light | Position C | Position D | Position E |
|---|---|---|---|
| Input light | Not polarized | Not polarized | Not polarized |
| Polarized light from the second polarizing element 23 (absorbing the light that is parallel to the Y axis, and the light that is parallel to the X axis is passed) | X-axis | X-axis | X-axis |
| Modulated light from the light modulator 22 (enabled) | Y-axis | Y-axis | Y-axis |
| Output light from the first polarizing element 21 | Y-axis (Visible) | Y-axis (Visible) | Y-axis (Visible) |

In other embodiments (although not shown in Table 1.1 and 1.2), the second polarizing element 23 can have an absorption axis parallel to X axis (absorb light at X axis), and the light modulator 22 used can be enabled to rotate the light by 90 degrees. When the light modulator 22 is enabled, the inclined output light with its polarized direction parallel to the Y axis will be absorbed. In this embodiment, the input light passes through the second polarizing element 23, which absorbs light at X axis, and the polarized light from the second polarizing element 23 is parallel to the Y axis. Afterward, the polarized light passes through the light modulator 22, and the polarized direction of the modulated light from the light modulator 22 is changed from the Y axis to the X axis. Thus, the inclined output light will is not parallel to the Y axis (or dark at the Y axis), instead, the inclined output light has its polarized direction parallel to the X axis. The content of the display device 100 can be invisible at the positions C and D, and can be visible at positions A and B. Thus, the display device 100 can also be in the privacy mode and the landscape mode as shown in FIG. 6A.

Figure 6B:
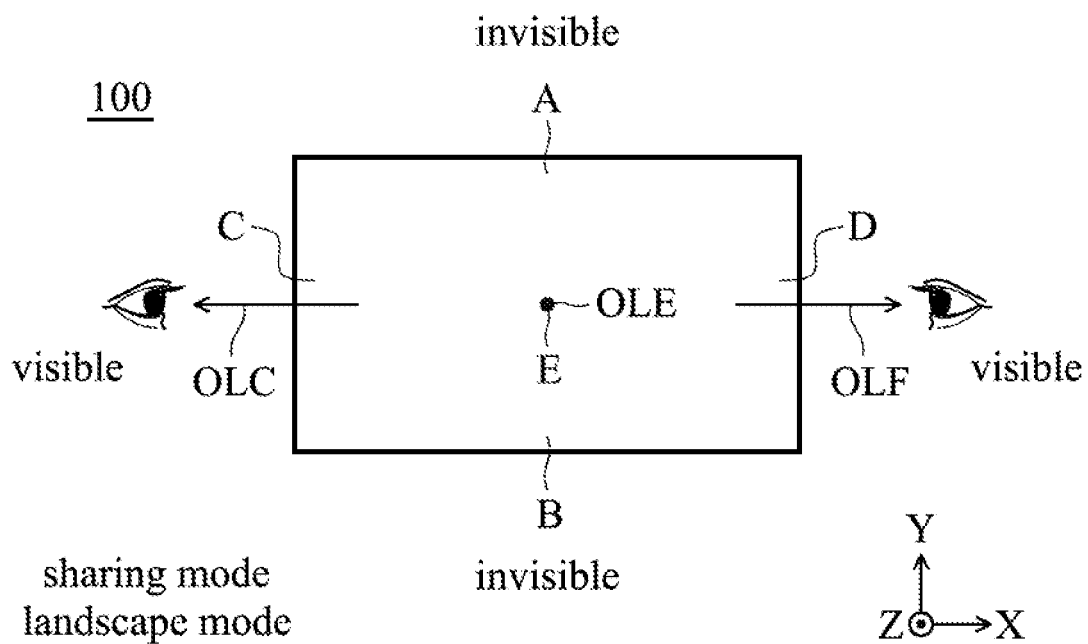
FIG. 6B shows a top view of the display device according to some embodiments of the present disclosure.

The polarized directions of the output lights when the light modulator 22 is enabled are shown in Table 2.1 and Table 2.2 below. In this way, as shown in FIG. 6B, at the observation position on the sides A and B, no output light can be observed. That is, content shown in the display device 100 is invisible to the observer on the sides A and B. However, at the observation position on the sides C and D, output light can be observed. That is, content shown in the display device 100 is visible to the observer on the sides C and D. Thus, when the display device 100 is arranged in a landscape mode (for example, by the user), the display device 100 can be in a sharing mode. On the other hand, as shown in FIG. 6D, when the display device 100 is arranged in a portrait mode, the display device 100 can be in a privacy mode.

As shown in Table 2.1 and 2.2, the second polarizing element 23 used can have an absorption axis parallel to Y axis (absorb light at Y axis), and the light modulator 22 used can be enabled to rotate the light by 90 degrees. When the light modulator 22 is enabled, light at X axis is absorbed, and the polarized direction of the light passed by the second polarizing element 23 and the light modulator 22 will be Y axis. In this embodiment, the input light passes through the second polarizing element 23, which absorbs light at Y axis, and the polarized light from the second polarizing element 23 is parallel to the X axis. Afterward, the polarized light passes through the light modulator 22, and the polarized direction of the modulated light from the light modulator 22 is changed from the X axis to the Y axis. Thus, the inclined output light will is not parallel to the X axis (or dark at the X axis), instead, the inclined output light has its polarized direction parallel to the Y axis. Thus, the inclined output light will be dark at X axis, and the content of the display device 100 can be invisible at positions A and B, and can be visible at positions C and D. Thus, the display device 100 can be in the sharing mode and the landscape mode as shown in FIG. 6B.

In other embodiments (although not shown in Table 2.1 and 2.2), the second polarizing element 23 can have an absorption axis parallel to X axis (absorb light at X axis), and when the light modulator 22 is disabled, the inclined output light with its polarized direction parallel to the X axis will be absorbed. Thus, the inclined output light is not parallel to the X axis (or dark at the X axis), and the content of the display device 100 can be invisible at positions A and B, and can be visible at positions C and D. Thus, the display device 100 can also be in the sharing mode and the landscape mode as shown in FIG. 6B.

Therefore, the display device 100 may be switched between the sharing mode and the privacy mode when the display device 100 is in the landscape mode, and the display device 100 may be switched between the sharing mode and the privacy mode when the display device 100 is in the portrait mode.

To determine if an element is the same as or similar to or equivalent to the first polarize element 21 or not, the element to be determined can be analyzed using a Luminance Meter, such as Topcon BM-5A, but not limited thereto. It should be noted that the element to be determined may be originally installed or mounted in an electronic device or a display device (which may include a privacy module), or the element to be determined may be originally installed or mounted in a privacy module. That is, the element to be determined may be retrieved from an electronic device, a display device, or a privacy module. In some embodiments, an additional polarizer film with an absorption axis along the Y axis can be used together with the element to be determined. For example, the light can passes through the element to be determined and the additional polarizer, and the brightness of the light output at a vertical position and at an inclined position can be analyzed respectively using a Luminance Meter. As mentioned in previous descriptions, the vertical position of the element to be determined is the position in front of its output surface (may refer to the output surface 21S of the first polarizing element 21) and is perpendicular to its output surface (output surface 21S for the first polarizing element 21), and the inclined position is the position not perpendicular to its output surface. FIG. 3B shows the light output from the first polarizing element 21. By providing the additional polarizer (which absorb light in the Y axis) on the the first polarizing element 21, the light in the Y axis (at positions C and D) can be further absorbed. The result will show that output light at positions C and D is dark, output light at positions A and B is bright, and vertical output light is bright. If the element to be determined shows the same or similar result, the element to be determined may be the first polarizing element 21.

Figure 7A:
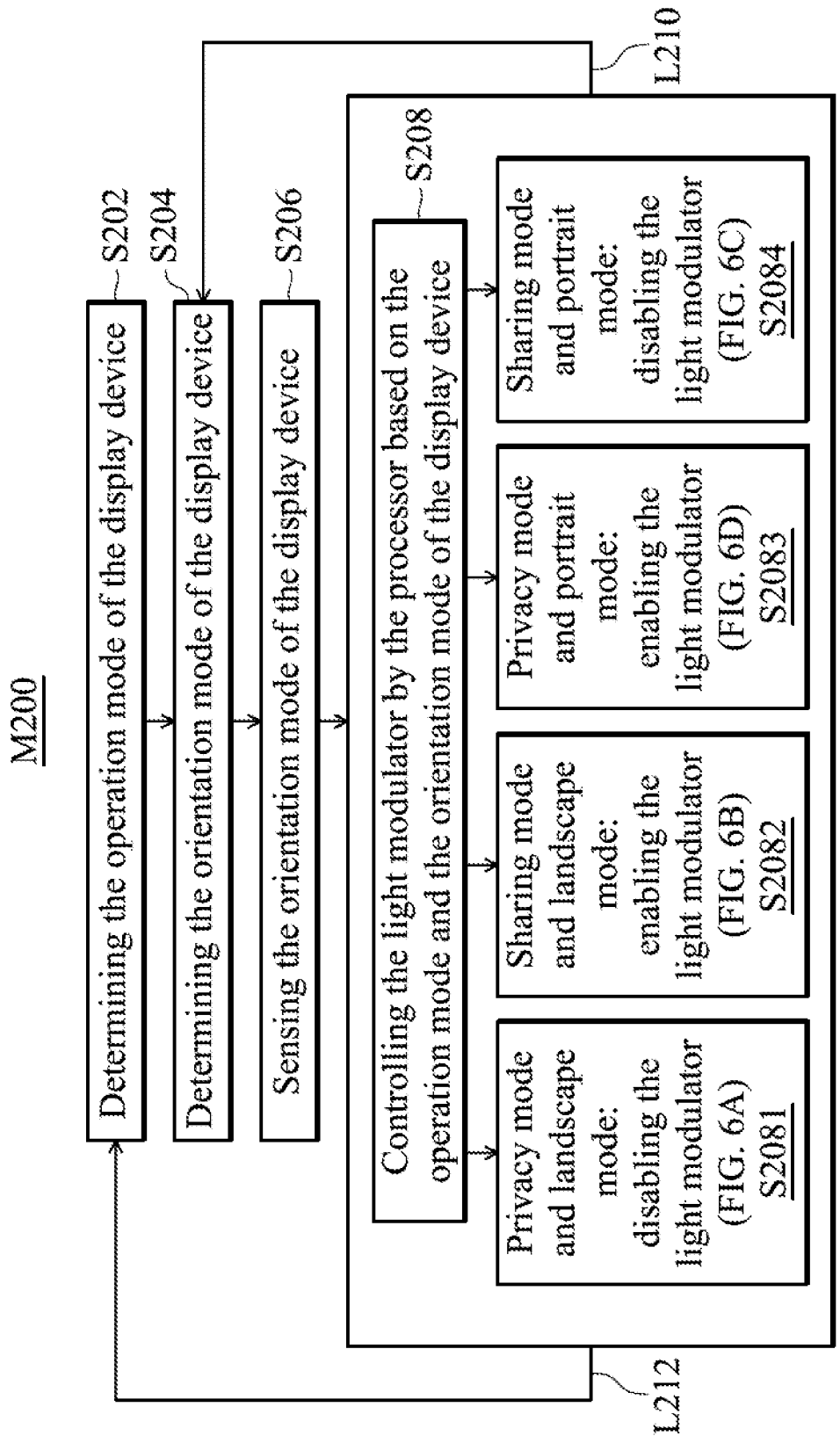
FIG. 7A is a flowchart of a display device control method according to some embodiments of the present disclosure.

Please refer to FIG. 7A, which is a flowchart of a display device control method M200 according to some embodiments of the present disclosure. Please note that the sequence of steps shown in FIG. 7A is only an example, and the sequence of the steps is not limited to the flowchart shown in FIG. 7A.

The device control method M200 may start with step S202. According to some embodiments, in step S202, the operation mode (sharing mode and privacy mode) of the display device 100 is determined. According to some embodiments, in step S202, the operation mode of the display device 100 may be determined by the user. According to some embodiments, in step S202, the user can choose/input between the sharing mode and the privacy mode, according to his or her preference.

According to some embodiments, in step S202, after determining the operation mode, an operation signal which indicates the operation mode of the display device 100 is transmitted to a processor of the display device 100. The display device control method M200 then proceeds to step S204.

According to some embodiments, in step S204, the orientation mode (landscape mode and portrait mode) of the display device 100 is determined. According to some embodiments, in step S204, the orientation mode of the display device 100 may be determined by the user by rotating the display device 100. According to some embodiments, in step S204, the user can rotate between the landscape mode and the portrait mode according to his or her preference.

Please note that according to some embodiments, the sequence of step S202 and step S204 may be exchanged. That is, in some embodiments, the device control method M200 may start with step S204, followed by step S202. The display device control method M200 then proceeds to step S206.

According to some embodiments, in step S206, the orientation mode of the display device 100 is sensed. In some embodiments, the sensor may be a gyro sensor, or any other suitable sensor for sensing the orientation mode of the display device 100. According to some embodiments, in step S206, after the orientation mode is sensed, an orientation signal which indicates the orientation mode of the display device 100 is transmitted to the processor of the display device 100. The display device control method M200 then proceeds to step S208.

According to some embodiments, in step S208, the light modulator 22 is controlled by the processor of the display device 100 based on the operation mode and the orientation mode of the display device 100. According to some embodiments, in step S208, the light modulator 22 is controlled by the processor of the display device 100 based on the operation signal and the orientation signal transmitted to (or received by) the processor of the display device 100. Please note that controlling the light modulator 22 may include applying or not applying voltage to the light twist element 221 from the first electrode 222a and the second electrode 222b.

According to some embodiments, step S208 may include S2081 (FIG. 6A), S2082 (FIG. 6B), S2083 (FIG. 6D) and S2084 (FIG. 6C).

According to some embodiments, in step S2081, the light modulator 22 can be disabled when the display device 100 is in the privacy mode and the landscape mode, as shown in FIG. 6A. In some embodiments, the second polarizing element 23 can have an absorption axis parallel to Y axis. In some embodiments, the second polarizing element 23 can have an absorption axis parallel to X axis, and the light modulator 22 can be enabled, thus the display device 100 can be in the privacy mode and the landscape mode, as shown in FIG. 6A.

According to some embodiments, in step S2082, the light modulator 22 can be enabled when the display device 100 is in the sharing mode and the landscape mode. In some embodiments, the second polarizing element 23 can have an absorption axis parallel to Y axis. In some embodiments, the second polarizing element 23 can have an absorption axis parallel to X axis, and the light modulator 22 can be disabled, thus the display device 100 can be in the sharing mode and the landscape mode as shown in FIG. 6B.

According to some embodiments, in step S2083, the light modulator 22 can be enabled when the display device 100 is in the privacy mode and the portrait mode. In some embodiments, the second polarizing element 23 can have an absorption axis parallel to Y. In some embodiments, the second polarizing element 23 can have an absorption axis parallel to X axis, and the light modulator 22 can be disabled, thus the display device 100 can be in the privacy mode and the portrait mode as shown in FIG. 6D.

In some embodiments, the light modulator 22 can be enabled or disabled to change the operation mode when the display device is in the landscape mode. In detail, the privacy module 20 includes the first polarizing element 21, the light modulator 22, and the second polarizing element 23 (with absorption axis in the Y axis). When the light modulator 22 is disabled (Tables 1.1 and 1.2), the light output from the display device 100 in the landscape mode can be as shown in FIG. 6A, which is in the privacy mode. In addition, when the light modulator 22 is enabled (Tables 2.1 and 2.2), the light output from the display device 100 in the landscape mode can be as shown in FIG. 6B, which is in the sharing mode. In some other embodiments, the second polarizing element 23 used can have an absorption axis in the X axis. By means of the same principle, the light modulator 22 can be enabled or disabled to obtain the light output as shown in FIG. 6A and FIG. 6B respectively, and detailed descriptions are omitted.

In some embodiments, the light modulator 22 can be enabled or disabled to change the operation mode when the display device is in the portrait mode. In detail, the privacy module 20 includes the first polarizing element 21, the light modulator 22, and the second polarizing element 23 (with absorption axis in the Y axis). When the light modulator 22 is disabled (Tables 1.1 and 1.2), the light output from the display device 100 in the portrait mode can be as shown in FIG. 6C, which is in the sharing mode. In addition, when the light modulator 22 is enabled (Tables 2.1 and 2.2), the light output from the display device 100 in the portrait mode can be as shown in FIG. 6D, which is in the privacy mode. In some other embodiments, the second polarizing element 23 used can have an absorption axis in the X axis. By means of the same principle, the light modulator 22 can be enabled or disabled to obtain the light output as shown in FIG. 6C and FIG. 6D respectively, and detailed descriptions are omitted.

According to some embodiments, in step S2084, the light modulator 22 can be disabled when the display device 100 is in the sharing mode and the portrait mode. In some embodiments, the second polarizing element 23 can have an absorption axis parallel to Y. In some embodiments, the second polarizing element 23 can have an absorption axis parallel to X axis, and the light modulator 22 can be disabled, thus the display device 100 can be in the sharing mode and the portrait mode as shown in FIG. 6C.

According to some embodiments, the display device control method M200 may revert back to step S204 in the loop L210. According to some embodiments, in loop L210, the orientation mode of the display device 100 is re-determined after the light modulator 22 is controlled.

According to some embodiments, the display device control method M200 may revert back to step S202 in the loop L212. According to some embodiments, in loop L212, the operation mode of the display device 100 is re-determined after the light modulator 22 is controlled.

Therefore, according to the display device control method M200, the light modulator 22 is controlled based on the operation mode and the orientation mode of the display device 100. Moreover, in some embodiments, the light at the right side (position D) and left side (position C) of the display device 100 may pass through or be absorbed by controlling the light modulator 22. In some embodiments, the light at the top side (position A) and bottom side (position B) of the display device 100 may pass through or be absorbed by controlling the light modulator 22. Furthermore, the display device 100 may switch between the sharing mode and the privacy mode when the display device 100 is in the landscape mode, and the display device 100 may switch between the sharing mode and the privacy mode when the display device 100 is in the portrait mode.

Figure 7B:
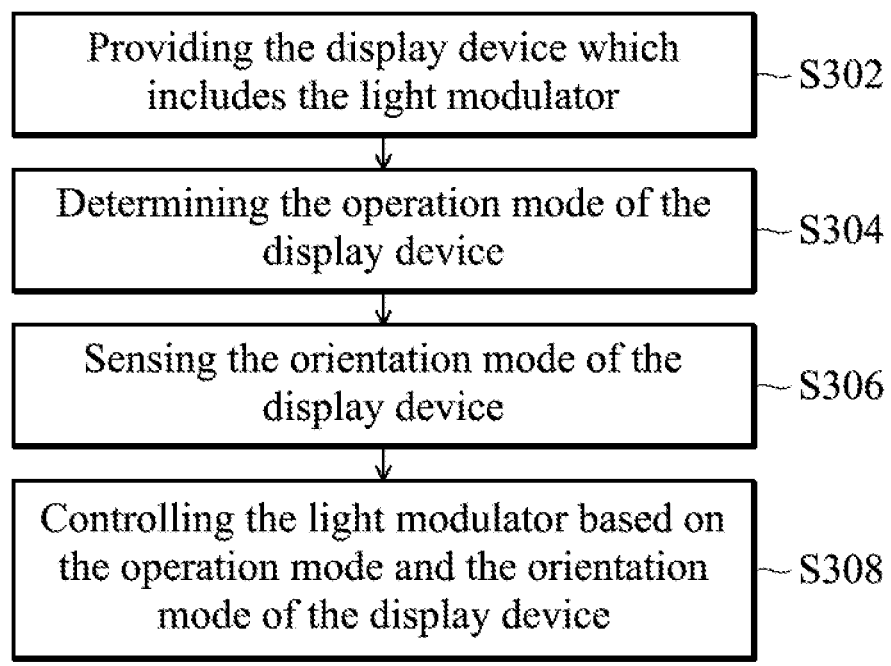
FIG. 7B is a flowchart of a display device control method according to some embodiments of the present disclosure.

Please refer to FIG. 7B, which is a flowchart of a display device control method M300 according to some embodiments of the present disclosure. Please note that the sequence of steps shown in FIG. 7B is only an example, and the sequence of the steps is not limited to the flowchart shown in FIG. 7B.

The device control method M300 may start with step S302. According to some embodiments, in step S302, the display device 100 is provided. According to some embodiments, the display device 100 includes a light modulator 22. The display device control method M300 then proceeds to step S304.

According to some embodiments, in step S304, the operation mode (sharing mode and privacy mode) of the display device 100 is determined. According to some embodiments, in step S304, the operation mode of the display device 100 may be determined by the user. According to some embodiments, in step S304, the user can choose/input between the sharing mode and the privacy mode, according to his or her preference. The display device control method M300 then proceeds to step S306.

According to some embodiments, in step S306, the orientation mode (landscape mode and portrait mode) of the display device 100 is sensed. According to some embodiments, in step S306, the orientation mode of the display device 100 may be determined by the user by rotating the display device 100. According to some embodiments, in step S306, the user can rotate between the landscape mode and the portrait mode according to his or her preference The display device control method M300 then proceeds to step S308.

According to some embodiments, in step S308, the light modulator 22 is controlled based on the operation mode and the orientation mode of the display device 100.

According to the display device control method M300, the display device 100 may switch between the sharing mode and the privacy mode when the display device 100 is in the landscape mode, and the display device 100 may switch between the sharing mode and the privacy mode when the display device 100 is in the portrait mode.

Figure 8A:
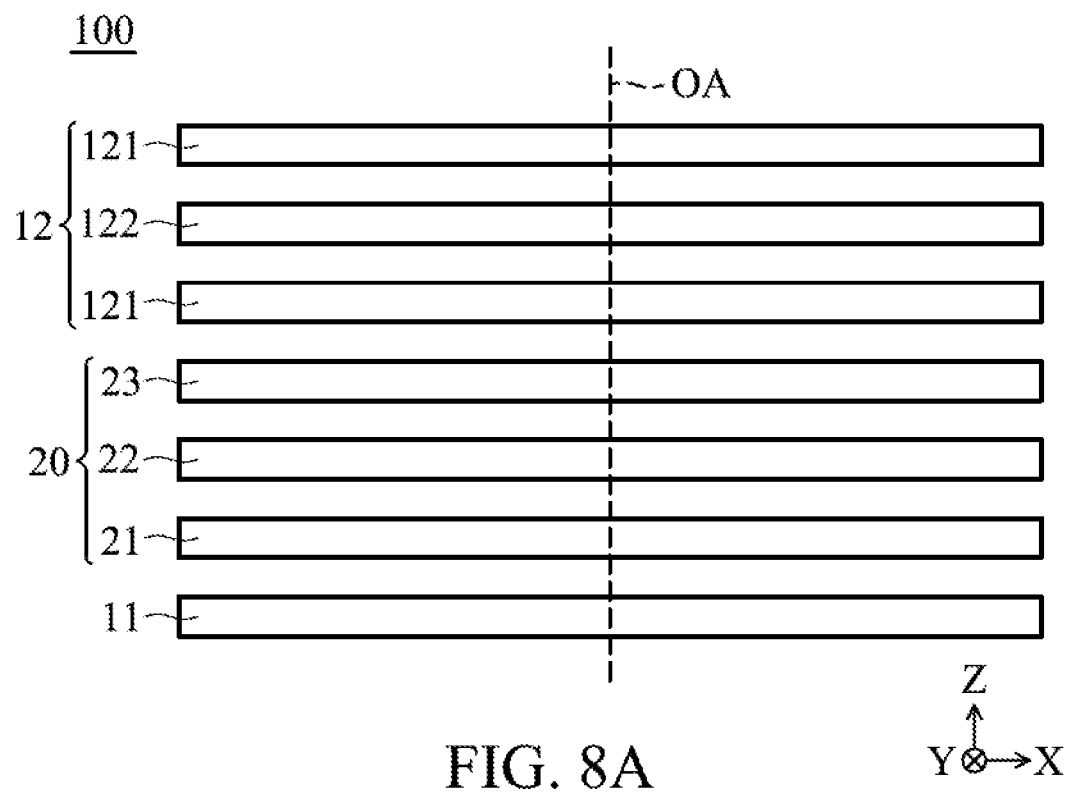
FIG. 8A shows some exemplary embodiments of the configuration of the display device.

Please refer to FIG. 8A, which shows some exemplary embodiments of the configuration of the display device 100. As shown in FIG. 8A, the display module 10 may further include a liquid-crystal panel 12. The liquid-crystal panel 12 may include two display module polarizing elements 121 and a liquid-crystal cell 122. The liquid-crystal cell 122 can be disposed between the two display module polarizing elements 121. The privacy module 20 may be disposed between the light source 11 and the liquid-crystal panel 12. The first polarizing element 21 can be disposed between the light source 11 and the light modulator 22. The light modulator 22 can be disposed between the first polarizing element 21 and the second polarizing element 23. The second polarizing element 23 can be disposed between the light modulator 22 and one of the display module polarizing elements 121.

In some embodiments, the light source 11 may be any backlight unit that is suitable for the liquid-crystal panel 12. The liquid-crystal cell 122 may be any liquid crystal mode, such as a twisted nematic liquid crystal (TN liquid crystal), a vertical Alignment liquid crystal (VA liquid crystal), an in-plane switching liquid crystal (IPS liquid crystal), a fringe field switching liquid crystal (FFS liquid crystal), or an optically compensated bend (OCB liquid crystal), etc., but not limited thereto. In some embodiments, the display module polarizing elements 121 may include a compensation film (retardation film) for a wider viewing angle.

In some embodiments (although not shown), the second polarizing element 23 may be omitted. In these cases, the light modulator 22 can be disposed between the first polarizing element 21 and one of the display module polarizing elements 121. That is, the light modulator 22 can be in contact with the display module polarizing elements 121 disposed in the liquid-crystal panel 12. According to some embodiments, without the second polarizing element 23, the display device 100 may be thinner and lighter, and the output light OL may be brighter.

Figure 8B:
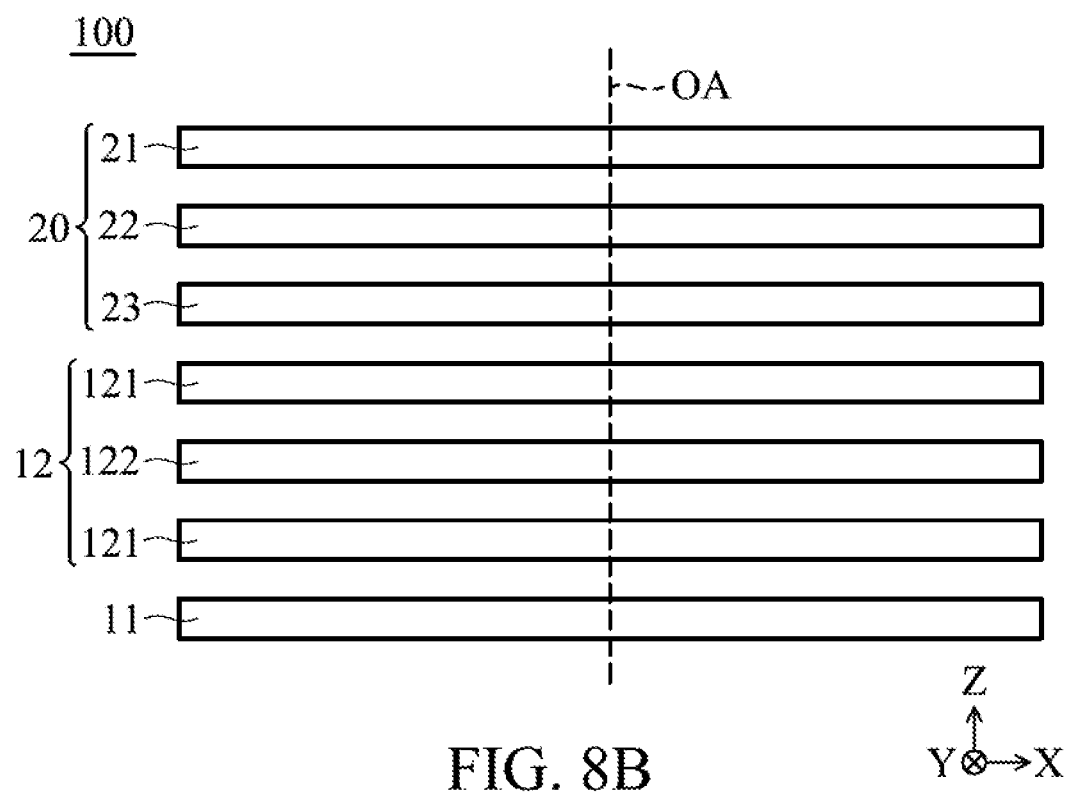
FIG. 8B shows some exemplary embodiments of the configuration of the display device.

Please refer to FIG. 8B, which shows some exemplary embodiments of the configuration of the display device 100. In the embodiment shown in FIG. 8B, the liquid-crystal panel 12 may be disposed between the privacy module 20 and the light source 11. The light modulator 22 can be disposed between the first polarizing element 21 and the second polarizing element 23. The second polarizing element 23 can be disposed between the light modulator 22 and one of the display module polarizing elements 121.

In some embodiments (although not shown), the second polarizing element 23 may be omitted. In these cases, the light modulator 22 can be disposed between the first polarizing element 21 and one of the display module polarizing elements 121. That is, the light modulator 22 can be in contact with the display module polarizing elements 121. According to some embodiments, without the second polarizing element 23, the display device 100 may be thinner and lighter, and the output light OL may be brighter.

It should be noted that in the abovementioned configuration, the first polarizing element 21 can be not in contact with the display module polarizing elements 121. According to some embodiments, the light modulator 22 can be disposed between the first polarizing element 21 and the display module polarizing elements 121 when the display module polarizing elements 121 is existed.

Figure 8C:
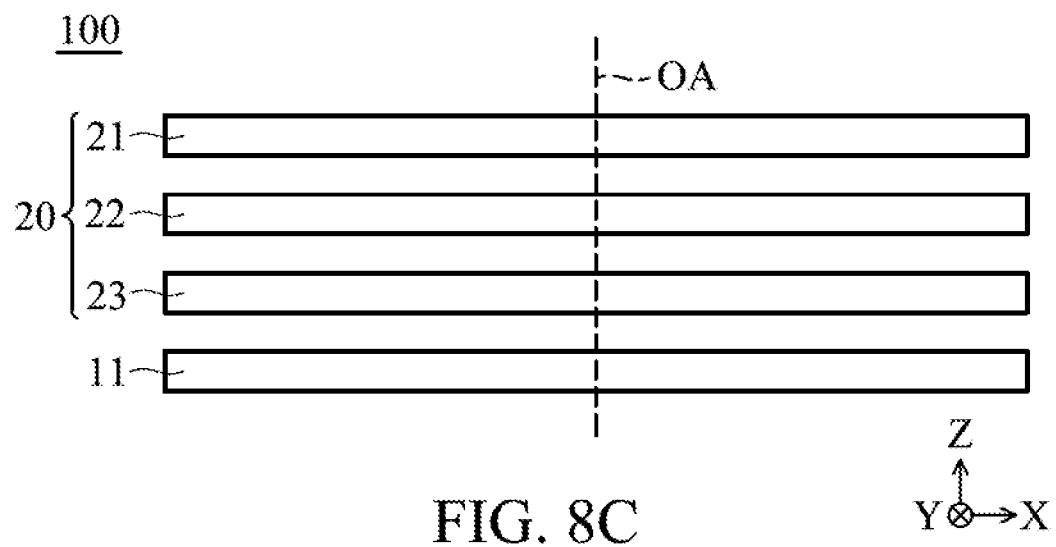
FIG. 8C shows some exemplary embodiments of the configuration of the display device.

Please refer to FIG. 8C, which shows some exemplary embodiments of the configuration of the display device 100. In the embodiment shown in FIG. 8C, the light source 11 may include or may be electronic paper (E-paper), or a light emitting display, such as an organic light-emitting diode (OLED), a mini light-emitting diode (mini LED), a micro light-emitting diode (micro LED), or a cathode-ray tube (CRT), but not limited thereto. In the embodiment shown in FIG. 8C, the light modulator 22 can be disposed between the first polarizing element 21 and the second polarizing element 23, and the second polarizing element 23 can be disposed between the light modulator 22 and the light source 11. In other embodiments, the light modulator 22 can be disposed between the first polarizing element 21 and the second polarizing element 23, and the first polarizing element 21 can be disposed between the light modulator 22 and the light source 11.

Figure 8D:
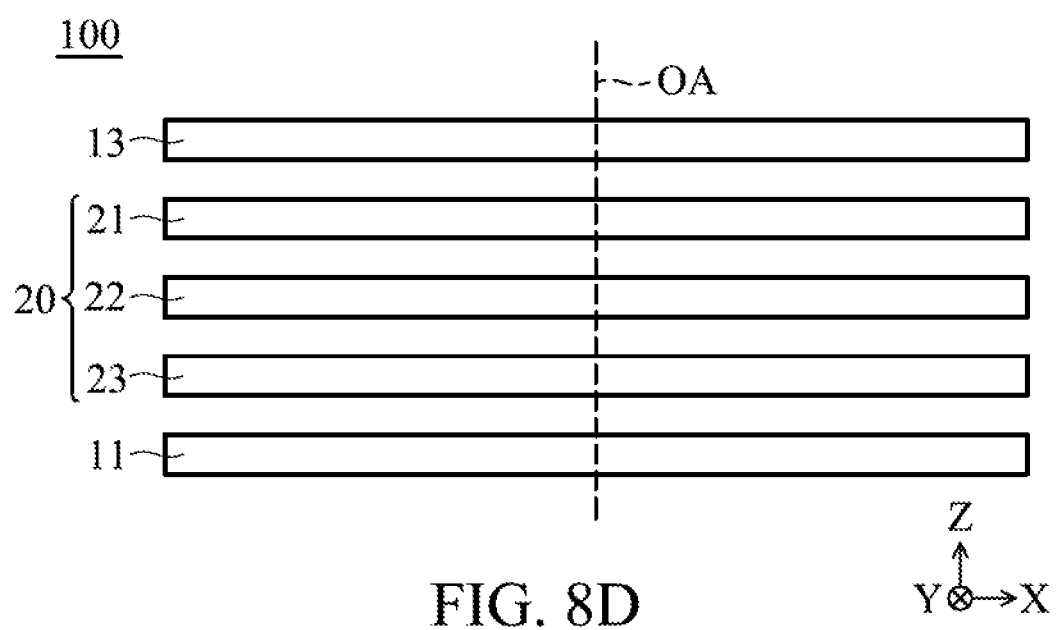
FIG. 8D shows some exemplary embodiments of the configuration of the display device.

Please refer to FIG. 8D, which shows some exemplary embodiments of the configuration of the display device 100. In the embodiment shown in FIG. 8C, the light source 11 may include or may be electronic paper (E-paper) with electronic ink (E ink), and the display module 10 may further include a front light 13. The privacy module 20 can be disposed between the light source 11 and the front light 13. The first polarizing element 21 can be disposed between the front light 13 and the light modulator 22. The light modulator 22 can be disposed between the first polarizing element 21 and the second polarizing element 23. The second polarizing element 23 can be disposed between the light modulator 22 and the light source 11.

In some embodiments, the light source 11 may include or may be electronic paper (E-paper) with a reflective liquid-crystal display (R-LCD), or a transflective liquid-crystal display.

In some embodiments, the privacy module 20 is disposed between the light source 11 and the front light 13. The first polarizing element 21 is disposed between the light source 11 and the light modulator 22. The light modulator 22 is disposed between the first polarizing element 21 and the second polarizing element 23. The second polarizing element 23 is disposed between the light modulator 22 and the front light 13.

In some embodiments, the front light 13 is disposed between the light source 11 and the privacy module 20. The front light 13 is disposed between the light source 11 and the second polarizing element 23. The light modulator 22 is disposed between the first polarizing element 21 and the second polarizing element 23. The second polarizing element 23 is disposed between the light modulator 22 and the front light 13.

In some embodiments, the front light 13 is disposed between the light source 11 and the privacy module 20. The front light 13 is disposed between the light source 11 and the first polarizing element 21. The first polarizing element 21 is disposed between the front light 13 and the light modulator 22. The light modulator 22 is disposed between the first polarizing element 21 and the second polarizing element 23.

In conclusion, the embodiments of the present disclosure provide a display device 100 with a privacy module 20. In some embodiments, the privacy module includes a first polarizing element, the vertical input light will not be polarized by the first polarizing element, and the inclined input light can be polarized by the first polarizing element. In some embodiments, by means of the privacy module, the display device can be switched between the sharing mode and the privacy mode, whether in the landscape or portrait mode. In some embodiment, the light modulator of the privacy module can be enabled or disabled to change the privacy or sharing mode of the display device. In some embodiments, both the landscape and portrait modes can provide the privacy and sharing modes.

While the embodiments and the advantages of the present disclosure have been described above, it should be understood that those skilled in the art may make various changes, substitutions, and alterations to the present disclosure without departing from the spirit and scope of the present disclosure. It should be noted that different embodiments may be arbitrarily combined as other embodiments as long as the combination conforms to the spirit of the present disclosure. In addition, the scope of the present disclosure is not limited to the processes, machines, manufacture, composition, devices, methods and steps in the specific embodiments described in the specification. Those skilled in the art may understand existing or developing processes, machines, manufacture, compositions, devices, methods and steps from some embodiments of the present disclosure. Therefore, the scope of the present disclosure includes the aforementioned processes, machines, manufacture, composition, devices, methods, and steps. Furthermore, each of the appended claims constructs an individual embodiment, and the scope of the present disclosure also includes every combination of the appended claims and embodiments.

What is claimed is:

1. A display device, comprising:
   a display module, comprising a light source that emits an input light; and
   a privacy module, disposed on the display module and for receiving the input light, the privacy module comprising a first polarizing element for absorbing light in a predetermined direction,
   wherein the input light passes through the first polarizing element to output an output light from an output surface of the first polarizing element,
   wherein the output surface comprises a first edge, a second edge, a third edge, and a fourth edge, the second edge is connected to the first edge, the third edge is connected to the second edge, the fourth edge is connected to the first edge and the third edge, the third edge is opposite to the first edge, the fourth edge is opposite to the second edge, where the first edge and the third edge are parallel to a first direction, wherein the first direction is perpendicular to an optical axis of the display device, the second edge and the fourth edge are parallel to a second direction, the second direction is perpendicular to the optical axis of the display device and is perpendicular to the first direction, and wherein the output light from the first edge has a first polarized direction that is parallel to the first direction, the output light from the second edge has a second polarized direction that is parallel to the second direction, the output light from the third edge has a third polarized direction that is parallel to the first direction, and the output light from the fourth edge has a fourth polarized direction that is parallel to the second direction.

2. The display device as claimed in claim 1, wherein the predetermined direction is not parallel to the optical axis of the display device.

3. The display device as claimed in claim 2, wherein the first polarizing element comprises a light absorbing dye.

4. The display device as claimed in claim 3, wherein the light absorbing dye comprises a dichroic dye.

5. The display device as claimed in claim 3, wherein the light absorbing dye includes a longitudinal axis that is parallel to the optical axis.

6. The display device as claimed in claim 3, wherein the first polarizing element further comprises a liquid crystal for aligning the light absorbing dye.

7. The display device as claimed in claim 2, wherein the input light comprises a vertical input light parallel to the optical axis, and an inclined input light not parallel to the optical axis, and wherein the vertical input light is not polarized by the first polarizing element, and the inclined input light is polarized by the first polarizing element.

8. The display device as claimed in claim 2, wherein the privacy module further comprises a second polarizing element with an absorption axis perpendicular to the optical axis.

9. The display device as claimed in claim 8, wherein the privacy module further comprises a light modulator disposed between the first polarizing element and the second polarizing element, wherein a polarization direction of a light is changed after passing through the light modulator by changing a voltage applied to the light modulator.

10. The display device as claimed in claim 9, wherein the first polarizing element is disposed between the light source and the light modulator.

11. The display device as claimed in claim 1, wherein the privacy module further comprises:

a second polarizing element, having an absorption axis that is parallel to the first direction, a light modulator, disposed between the first polarizing element and the second polarizing element, wherein when the light modulator is disabled, a light output from a first observation position that is corresponding to the first edge of the first polarizing element is invisible, and a light output from a second observation position that is corresponding to the second edge of the first polarizing element is visible.

12. The display device as claimed in claim 11, wherein when the light modulator is enabled, the light output from the first observation position is visible, and the light output from the second observation position is invisible.

* * * * *